United States Patent [19]

Mignet et al.

[11] Patent Number: 4,747,625
[45] Date of Patent: May 31, 1988

[54] BRANCH PIPE MOUNTING ASSEMBLY

[75] Inventors: Vincent Mignet; Pierre Vigneron, both of Pont-A-Mousson, France

[73] Assignee: Pont-a-Mousson S.A., Nancy, France

[21] Appl. No.: 97,013

[22] Filed: Sep. 16, 1987

[30] Foreign Application Priority Data

Sep. 19, 1986 [FR] France .................. 86 13162

[51] Int. Cl.$^4$ .................................. F16L 41/00
[52] U.S. Cl. ................... 285/197; 285/209
[58] Field of Search ............ 285/197, 198, 199, 208, 285/209

[56] References Cited

U.S. PATENT DOCUMENTS

| | | | |
|---|---|---|---|
| 978,504 | 12/1910 | Stewart | 285/209 |
| 1,049,283 | 12/1912 | Westphal | 285/209 |
| 1,126,058 | 1/1915 | Moore | 285/209 |
| 3,218,093 | 11/1965 | Carlson | 285/197 |
| 4,135,258 | 1/1979 | Braga et al. | 285/197 X |
| 4,627,648 | 12/1986 | Montpetit | 285/197 |
| 4,702,501 | 10/1987 | McLennan | 285/197 |

*Primary Examiner*—Thomas F. Callaghan
*Attorney, Agent, or Firm*—Sughrue, Mion, Zinn, Macpeak and Seas

[57] ABSTRACT

A mounting assembly for a take-off branch of a primary pipe 1 includes a rectangular based, tubular connection member 3 extending outwardly from the pipe through a rectangular aperture 2 in the pipe wall and having clamping tongues 3c, 3d engaging under the aperture edges on opposite sides thereof, an external gasket 4 fitted over the connection member and seating against its base and the outer surface of the pipe, and a rigid saddle 5 overlying the gasket. Four extendible tightener bolts 7, 8 are installed between the corners of the saddle and abutment supports recessed into the connection member base, and are unthreaded during installation to compress the gasket and establish a uniform seal.

9 Claims, 2 Drawing Sheets

BRANCH PIPE MOUNTING ASSEMBLY

BACKGROUND OF THE INVENTION

This invention relates to an assembly for mounting a take-off branch or conduit to a primary pipe, for example a sewage disposal pipe.

Some known assemblies of this type comprise a connection member having a sole plate at its base, with an orifice in the sole plate being disposed opposite an aperture in the wall of the primary pipe. A gasket surrounds the base of the connection member to provide a seal between such member and the outer surface of the pipe, and fastening means are provided to anchor the connection member to the pipe.

With the gasket disposed on the outer surface of the pipe sealing defects attributable to the gasket extending within the interior of the pipe are avoided. In fact, sewage disposal pipes are typically made of centrifuged iron and are covered on the inside with a concrete grout or a centrifuged mortar to prevent the corrosion of the iron. When a branch aperture is cut out from such a pipe, the inner covering can easily crack and typically leaves a jagged edge, and an interiorly disposed gasket is thus not capable of providing a tight seal.

While an exteriorly disposed gasket is therefore advantageous in mounting take-off branches to pipes of this type, sealing problems are still encountered, especially above internal pressures of 1.2 to 1.3 bars, and the structure for rigidly fastening the connection member to the pipe is typically complicated and costly, and is relatively difficult and tedious to install. Moreover, these conventional mounting assemblies do not enable periodic retightening to compensate for production tolerances arising from the dimensions of the aperture in the primary pipe. Such tolerances cause considerable variation in the compression of the gasket, which adversely affects its sealing performance.

SUMMARY OF THE INVENTION

To overcome these drawbacks and disadvantages of the prior art the present invention provides a take-off branch mounting assembly including a connection member having two clamping tongues extending outwardly from opposite sides of its base or sole plate and adapted to engage under opposite edges of the aperture on the interior of the primary pipe, a rigid saddle designed to fit around the base of the connection member and to lie on top of the exteriorly disposed gasket, and adjustable or expandable compression members inserted between the saddle and corresponding supports on the base of the connection member.

With such an arrangement the gasket can be uniformly compressed between both the saddle and the connection member base and between the saddle and the outer surface of the pipe to establish a tight seal. Moreover, the gasket is visible during its installation, thus enabling its proper orientation to be easily confirmed and thereby avoiding any subsequent sealing defects following the tightening of the assembly.

DETAILED DESCRIPTION OF THE PREFERRED EMBODIMENT

The various drawing figures show a primary sewage disposal pipe 1, for example, having a square or rectangular aperture 2 made in the pipe wall by a disc cutter or the like.

Figure 1:
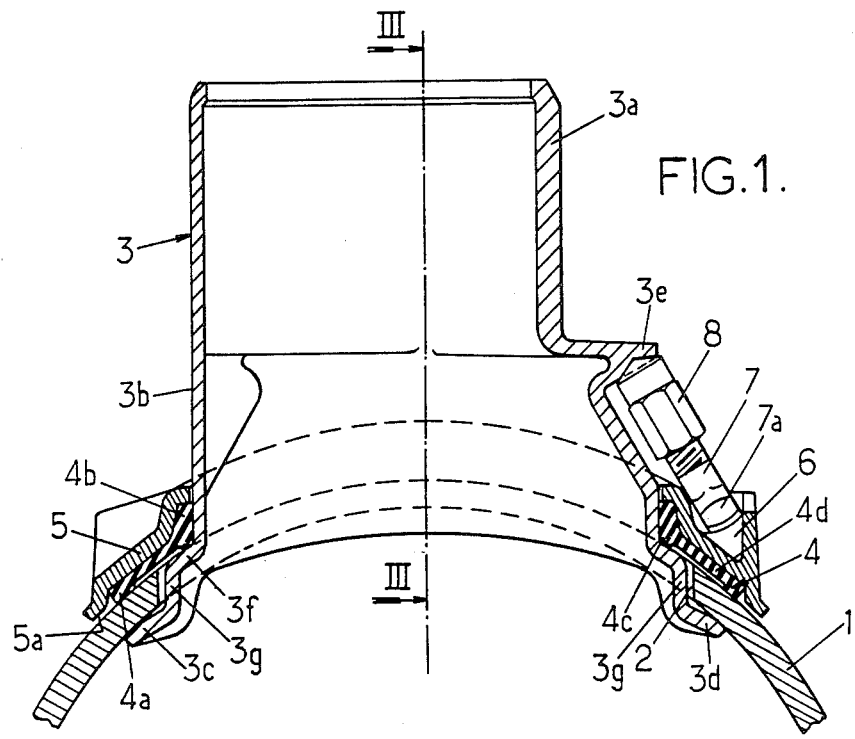
FIG. 1 is a sectional elevation of an assembly in accordance with the invention taken along line I—I of FIG. 2.
Figure 2:
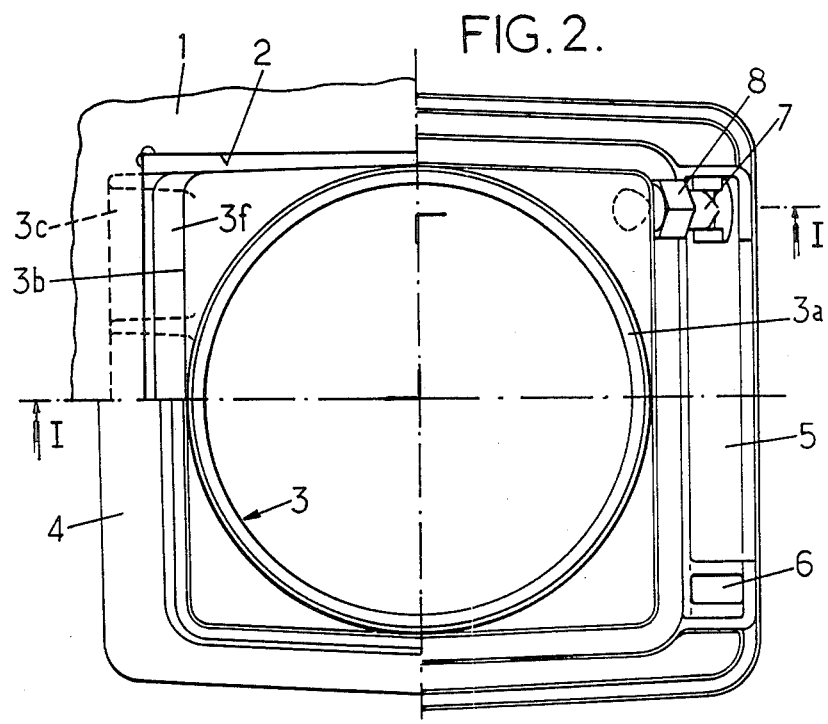
FIG. 2 is a plan view of the assembly of FIG. 1, showing sequential quarter views starting from the upper right in a clockwise direction, of the completed assembly, of the assembly without a tightening bolt, of the assembly without the saddle, and of the assembly without both the saddle and the gasket.
Figure 3:
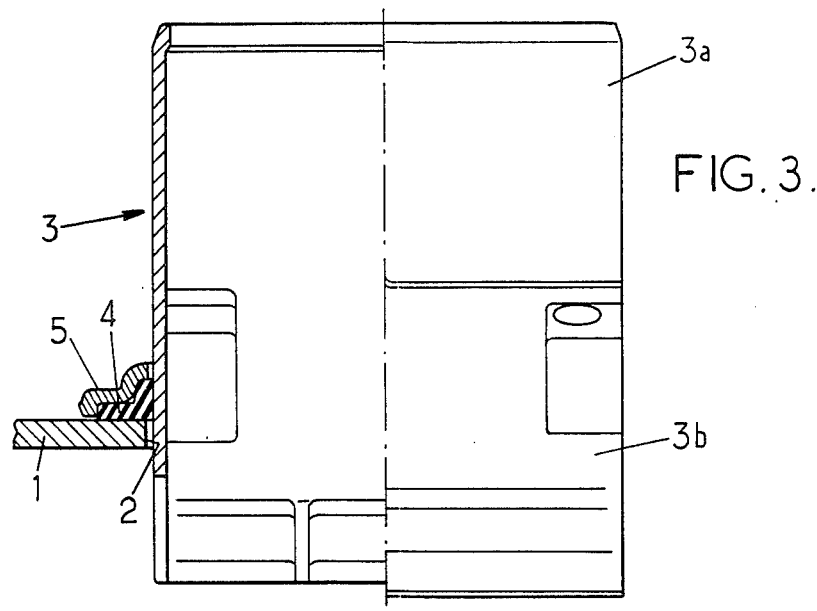
FIG. 3 is an outer half-view of the connection member alone on the right side, and a half-view in section taken along line III—III of FIG. 1 on the left side.
Figure 4:
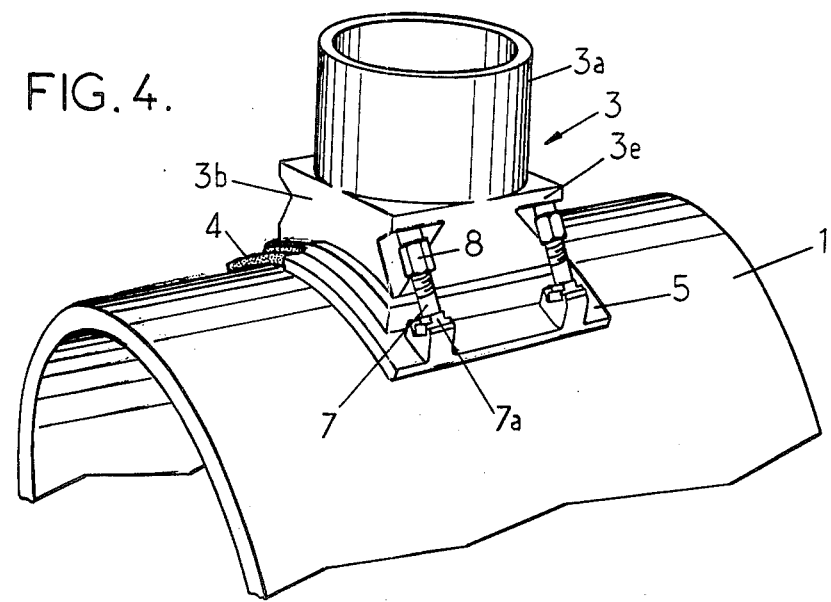
FIG. 4 is a perspective view, partially cut away to show the gasket, of a pipe equipped with the installed assembly of the invention.

A connection member 3 of the mounting assembly includes an upper cylindrical portion 3a whose outside diameter corresponds to the dimensions of a branch type pipe or conduit to be connected to it, followed by a generally square or rectangular base portion 3b, in turn followed by a curved rectangular portion 3g configured to match the shape and dimensions of the pipe wall aperture 2. Two lower opposite sides of the portion 3g are outwardly extended by clamping tongues 3c and 3d, one of which, tongue 3c, is slightly longer or wider than the other tongue. Both tongues are configured to engage under and bear against opposite internal edges of the aperture 2 as shown in FIG. 1, and together with the portion 3g define a sole plate of the connection member. The base portion 3b of the connection member has an undercut or notched out abutment support 3e at each of its four corners as best seen in FIG. 4, whose functions will be described below.

The outer sealing gasket 4 is molded in one piece of an elastomer material or the like, and includes:

(1) a base 4a of rectangular cross-section and of flat shape having a series of fine concentric and parallel scores on its surface facing the pipe to enhance the seal therewith, (2) a tubular neck 4b in the form of a truncated pyramid with rounded opposite sides and having a lower bead 4c configured to abut a shoulder 3f of the connection member, the inner surface of such neck being similarly provided with fine concentric and parallel sealing scores, and (3) a diaphragm 4d of reduced thickness extending between the base 4a and the neck 4b.

The gasket is compressed against the outer surfaces of the pipe and the connection member base to establish the necessary seal by a rigid saddle 5. The inner face of the saddle is configured to mate with or correspond to the outer face of the gasket 4 such that the gasket is embedded or seated in the saddle during installation and thus retained in a properly oriented position. The outer edges of the saddle terminate in flanges 5a which match the outer curvature of the pipe, and four receptacles 6 inclined inwardly towards the axis of the connection member at an angle of approximately 30° are provided at the corners of the saddle. The receptacles 6 are thus aligned with and face or open towards the abutment supports 3e of the connection member, with the intervening spaces being configured to receive adjustably expandable or extendible tightening members for compressing the saddle against the gasket, with the connection member serving as a fixed support by reason of its clamping tongues 3c, 3d bearing against the inner edges of the pipe aperture 2.

The fasteners may comprise double-nip head bolts 7 having conically tipped nuts 8. The elongate heads 7a of the bolts are accommodated in the recesses of the receptacles 6 in the saddle, and thus prevent any rotation of the bolts when the nut 8 is unscrewed to compressively urge the saddle 5 against the gasket 4. The conical ends or tips of the nuts 8 enable their rotation under the abutment supports 3e during the installation and tightening of the assembly, which is continued until the edge flanges 5a of the saddle seat against the outer surface of the pipe. Such limiting engagement between the saddle flanges and the pipe ensures that the base 4a and the neck 4b of the gasket are evenly compressed over their entire peripheries against the pipe 1 and the connection member 3, respectively, but prevents the gasket from being excessively compressed which could be detrimental to its sealing effect.

The periodic tightening or readjustment of the mounting assembly is simply performed by occasionally further unthreading the nuts 8, possibly with a torque wrench to ensure uniformity.

The installation of the assembly is equally simple, with the widest clamping tongue 3c of the connection member and the adjacent portion 3g joining it to the shoulder 3f being first introduced into the pipe aperture 2, followed by the other, narrower clamping tongue 3d. The gasekt 4 is then pushed down over the connection member until it is seated against the outer surface of the pipe and the base 3b of the member, whereafter the saddle 5 is lowered over the connection member and gasket, the tightening bolts 7 are installed, and the nuts 8 are unthreaded to compress the gasket and establish the described seal. The narrowed clamping tongue 3d and the inward step defined by the shoulders 3f of the connection member enable the latter to be inserted into and maneuvered or manipulated through the pipe wall aperture 2 from the exterior of the pipe during installation.

Beyond its simplicity and tight sealing properties, the mounting assembly of the invention also enables the use of rough-cast and therefore relatively inexpensive components, and avoids the necessity of providing any internal screw threads in the primary pipe.

What is claimed is:

1. A mounting assembly for securing a take-off branch to a primary pipe (1) having an aperture (2) in a wall thereof, said assembly comprising:
    (a) a hollow connection member (3) having a base portion (3b) extending outwardly through the pipe wall aperture, and two clamping tongues (3c, 3d) extending laterally outwardly from opposite lower edges of the base portion and engaging an inner surface of the pipe under opposite edges of the aperture,
    (b) a deformable gasket (4) surrounding and seated against a lower region of the base portion, and overlying and seated against an outer surface of the pipe surrounding the aperture in the manner of a collar,
    (c) a rigid saddle (5) disposed surrounding said lower region of the base portion of the connection member and overlying the gasket, and
    (d) a plurality of circumferentially spaced, axially extendible, adjustable tighteners (7, 8) disposed between the saddle and associated abutment supports (3e) on the connection member base portion for selectively urging the saddle axially of the connection member and towards the pipe and attendantly pulling the connection member clamping tongues tightly against the inner pipe surface, thereby compressing the gasket into sealing engagement with the lower region of the base portion and with the outer pipe surface surrounding the aperture.

2. An assembly according to claim 1, wherein the gasket comprises, in cross-section, a flat base (4a) designed to be pressed against the outer surface of the pipe, and a tubualr neck (4b) joined to the base by a reduced thickness diaphragm (4d) and designed to be pressed against the outer surface of the lower region of the connection member base portion.

3. An assembly according to claim 2, wherein the gasket has a bead (4c) designed to seat against a shoulder (3f) of the connection member base portion.

4. An assembly according to claim 1, wherein the saddle has an inner surface configuration complementary to the outer surface configuration of the gasket.

5. An assembly according to claim 1, wherein the saddle has an outer edge flange (5a) configured to mate with and abut against the outer surface of the pipe after tightening, to limit the compression of the gasket.

6. An assembly according to claim 1, wherein the tighteners comprise double-nip head bolts.

7. An assembly according to claim 6, wherein a head (7a) of each bolt is restrained from rotation in an associated corner receptacle (6) of the saddle, and a nut (8) fitted on an opposite end of each bolt can rotate under a corresponding abutment support.

8. An assembly according to claim 7, wherein the corner receptacles are inclined approximately 30° inwardly relative to the axis of the connection member.

9. An assembly according to claim 1, wherein:
    (a) the aperture is rectangular,
    (b) the base portion of the connection member is rectangular,
    (c) the gasket is saddle shaped,
    (d) the tighteners and abutment supports are individually disposed at four corners of the base portion, and
    (e) one of the clamping tongues is wider than the other clamping tongue to enable the introduction of the connection member into and through the pipe wall aperture during installation from the exterior of the pipe.

* * * * *